United States Patent
Boehme et al.

(10) Patent No.: US 7,805,237 B2
(45) Date of Patent: Sep. 28, 2010

(54) METHOD FOR OPERATING AN INTERNAL COMBUSTION ENGINE

(75) Inventors: Thomas Boehme, Wesendorf (DE); Wolfram Gottschalk, Magdeburg (DE); Olaf Magnor, Braunschweig (DE); Michael Schnaubelt, Gifhorn (DE); Matthias Schultalbers, Meinersen (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 337 days.

(21) Appl. No.: 11/983,354

(22) Filed: Nov. 8, 2007

(65) Prior Publication Data
US 2008/0215227 A1 Sep. 4, 2008

(30) Foreign Application Priority Data
Nov. 8, 2006 (DE) .................. 10 2006 053 253

(51) Int. Cl.
G05D 1/00 (2006.01)
(52) U.S. Cl. ............... 701/104; 701/109; 701/103; 123/443; 123/431; 123/480; 123/305
(58) Field of Classification Search ........... 701/104, 701/103, 105, 109; 123/295, 305, 431, 443, 123/480, 679, 685
See application file for complete search history.

(56) References Cited

U.S. PATENT DOCUMENTS

| 6,336,436 B1 | 1/2002 | Miyakubo et al. | |
| 6,631,704 B2* | 10/2003 | Ogawa et al. | 123/295 |
| 6,742,494 B2* | 6/2004 | Unger et al. | 123/305 |
| 6,978,771 B2* | 12/2005 | Kuzuyama et al. | 123/568.11 |
| 6,990,947 B2* | 1/2006 | Kuzuyama et al. | 123/294 |
| 7,073,466 B2 | 7/2006 | Bauer et al. | |

FOREIGN PATENT DOCUMENTS

| DE | 196 18 849 | 11/1997 |
| DE | 102 39 065 | 6/2002 |
| DE | 102 37 328 | 3/2004 |
| DE | 600 13 379 | 1/2005 |
| EP | 1 085 192 | 3/2001 |
| JP | 2000-192846 | 7/2000 |

* cited by examiner

Primary Examiner—Stephen K Cronin
Assistant Examiner—Raza Najmuddin
(74) Attorney, Agent, or Firm—Collard & Roe, P.C.

(57) ABSTRACT

A method for operating an internal combustion engine having a combustion method with homogeneous auto ignition. A driver's demand, predetermined by the gas pedal, is converted into a desired torque to be given off by the engine. A reference charge value for the air charge is determined by a working-point-dependent lambda value ($\lambda_{opt}$) that can be predetermined. Based on this, a throttle valve position is set. Parallel to this, a desired torque is calculated for the fuel path with a reference lambda value, and an actual charge is calculated to yield a fuel amount to be injected. The reference lambda value results from an optimal lambda value for the mode of operation of homogeneous compression ignition, as long as the lambda value is within the rich and lean limits, respectively, of the combustion method of homogeneous compression ignition. The fuel mass is varied within the rich and lean limits to compensate dynamic processes.

2 Claims, 1 Drawing Sheet

METHOD FOR OPERATING AN INTERNAL COMBUSTION ENGINE

CROSS REFERENCE TO RELATED APPLICATIONS

Applicants claim priority under 35 U.S.C. §119 of German Application No. 10 2006 053 253.8 filed Nov. 8, 2006 and issued Dec. 24, 2009.

BACKGROUND OF THE INVENTION

1. Field of the Invention

The invention relates to a method for operating an internal combustion engine having a combustion method with homogeneous auto ignition.

2. The Prior Art

Combustion methods are generally known in which a homogeneously pre-mixed fuel/air mixture is ignited by auto ignition. These combustion methods are frequently referred to as HCCI (homogeneous charge compression ignition). In order to achieve homogeneous combustion, a sufficiently high energy level must be present in the cylinder. This can be brought about, for example, by a high compression pressure and/or by a sufficient amount of hot residual gas. Control of the parameters that influence auto ignition, such as compression, exhaust gas reflux rate, injection time, fuel distribution, air filling, etc., is very complex. For example, a method for controlling the combustion sequence, in which an HCCI combustion process is modeled by internal status variables, and the output variables of the modeled combustion process are used to regulate the setting variables that influence the auto ignition is described in German Patent No. DE 102 37 328 B4. In this connection, setting variables can be the control of inlet and outlet valves of the internal combustion engine, for example, which can be variably controlled with regard to their stroke and their on time. Both the compression and the exhaust gas reflux rate, in the case of internal exhaust gas reflux, can be influenced by variable on times. Additional influence parameters can be the setting of an exhaust gas reflux valve, an adjustable compression ratio, or the injection parameters. In this connection, the operating mode of homogeneous auto ignition cannot be represented in all operating points, but rather are mostly limited to the range of partial load. It is difficult to manage the process, particularly in the marginal ranges and at dynamic operating transitions. Because of the leanness in the case of homogeneous auto ignition, the amount of torque that can be given off is limited. Furthermore, the characteristic field range is limited in the direction of a lower speed of rotation and load, in that it has to be possible for auto ignition to even take place. Up to the present, the combustion method is used practically only in limited characteristic field ranges, at almost stationary operation. In broad operating ranges, the internal combustion engine is operated in conventional manner.

Control systems are previously known for conventional combustion methods, which calculate a torque reference value for the torque to be given off by the internal combustion engine from the driver's demand (e.g. gas pedal position), on the basis of the torque. An example of such a structure is German Patent No. DE 196 18 849 A1. Proceeding from a desired torque determined by the driver's demand, a corrected desired torque is calculated by working-point-specific values read out of characteristic fields, for the ignition angle degree of effectiveness and the lambda degree of effectiveness, which torque is subsequently converted into a reference value for filling, and set by the throttle valve.

SUMMARY OF THE INVENTION

It is therefore an object of the present invention to create a control method for an internal combustion engine operated with homogeneous auto ignition, which method allows operation of the internal combustion engine in broad operating ranges, and provides a regulator structure that is easy to apply.

This task is accomplished, according to the invention, by a method for operating an internal combustion engine having a combustion method with homogeneous auto ignition, in which the driver's demand, predetermined by way of the gas pedal, is converted into a desired torque to be given off by the internal combustion engine. A reference cylinder charge value for the air charge is determined by way of a working-point-dependent lambda value ($\lambda_{opt}$) that can be predetermined, and based on this, a throttle valve position is set. Parallel to this, a desired torque is calculated with a reference lambda value, and an actual charge measured from the charge detection is calculated to yield a fuel amount to be injected. The reference lambda value results from the lambda value determined as being optimal for the mode of operation of homogeneous compression ignition, as long as the lambda value is within the rich and lean limits, respectively, of the combustion method of homogeneous compression ignition. The fuel mass is varied within the rich and lean limits, to compensate dynamic processes.

It is advantageous, according to the invention, that the fuel mass is adapted to the combustion method, for operation with homogeneous auto ignition, whereby an optimal lambda value for the homogeneous combustion is known from test bench results, and is the base value for a determination of the lambda reference value. Parallel to this, a lambda value is calculated at the rich limit and at the lean limit of the combustion method, and made available for calculating the lambda reference value. In this connection, the lambda reference value implements the optimal lambda value as long as this lambda value lies within the combustion method limits for the lambda value. In order to prevent the required lambda value from becoming smaller than the rich limit or greater than the lean limit, the lambda regulation continuously corrects the injection amount, so that the combustion method limits are not departed from.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

In the drawing.

DETAILED DESCRIPTION OF THE PREFERRED EMBODIMENT

Figure 1:
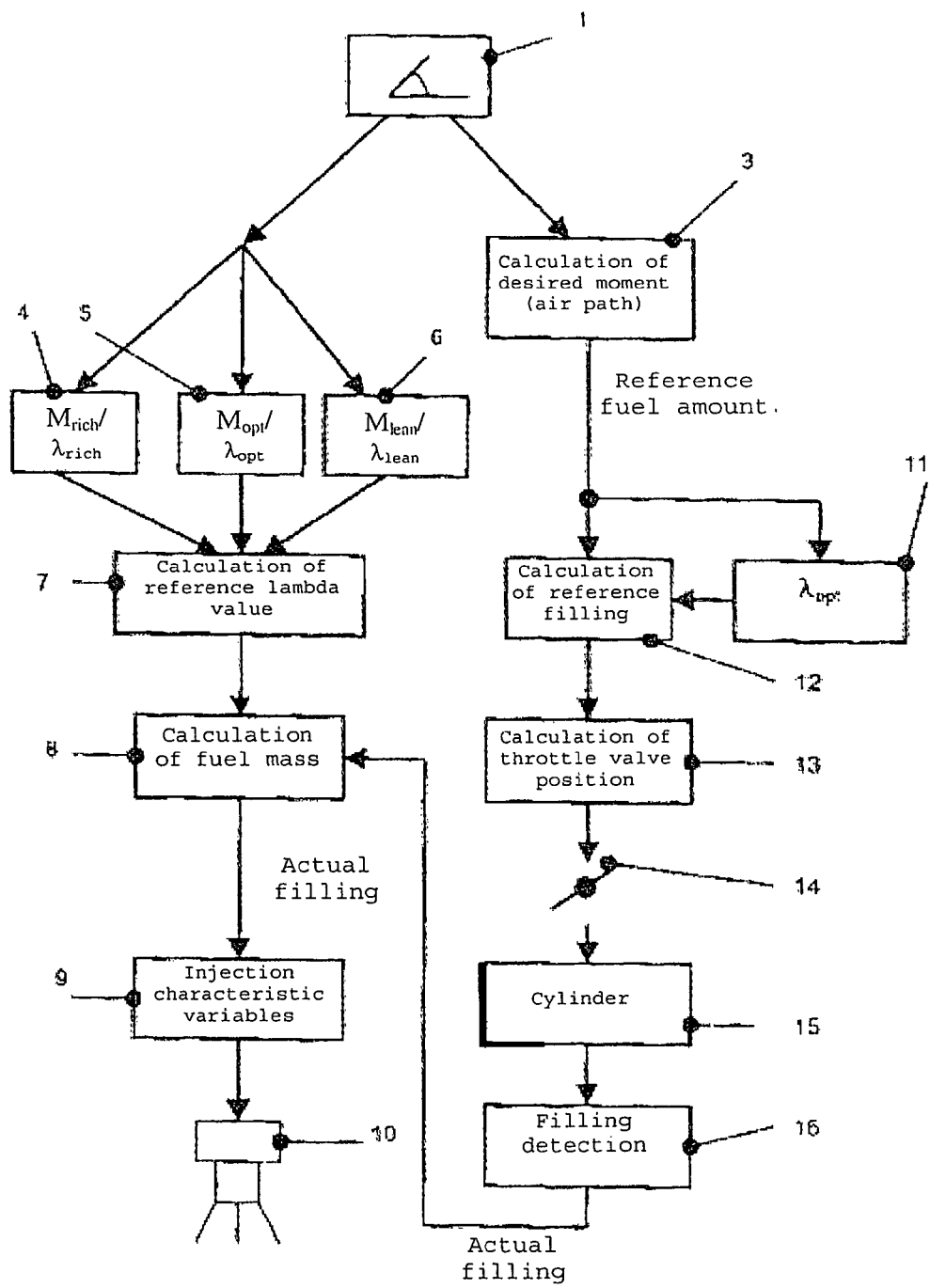
FIG. 1 shows a regulator structure for the operation of an internal combustion engine with homogeneous self-ignition.

Referring now in detail to the drawing, the torque desired by the driver is calculated from the position of a gas pedal 1, and converted to a corresponding richest, and leanest lambda 4, 5, and 6, respectively. This takes place on the basis of characteristic fields, whereby the air path, i.e., the amount of air to be fed do the cylinder, of the operating point predetermined by load and speed of rotation is another influence variable for the desired torque. At the output of the calculation of the torque for air path 3, a reference amount of fuel resulting from this desired torque is available. Assuming an operating-point-dependent optimal lambda value ($\lambda_{opt}$) 11 for the current working point, reference charge 12 is obtained with the reference amount of fuel.

This charge is subsequently converted into a throttle valve position 13 for operation with homogeneous auto ignition. The air path is the slower setting variable in comparison with the fuel injection, because of the gas inflow times. The air path therefore predetermines the working point for the fuel path, i.e., the amount of fuel to be injected. To calculate the amount of fuel to be injected, a determination of the charge that is present in cylinder 15 takes place (charge detection 16), which is an input variable for calculating fuel mass 8. The quick path, the metering of fuel, proceeds from the calculation of the optimal, richest, and leanest lambda (4, 5, and 6). The value for the air/fuel ratio that is sought, and thus the amount of fuel required, is obtained from calculating the reference lambda value. To compensate dynamic effects, the fuel mass can be adjusted between the richest and leanest lambda values that result from this. Calculation of fuel mass 9 to be injected takes place with the reference lambda value determined in this manner, with the actual charge calculated from charge detection 16, and this is implemented in injector 10 by way of controlling the injection time and injection duration.

Accordingly, while only a few embodiments of the present invention have been shown and described, it is obvious that many changes and modifications may be made thereunto without departing from the spirit and scope of the invention.

What is claimed is:

1. A method for operating an internal combustion engine with a combustion method of homogeneous auto ignition that converts a driver's demand, predetermined by way of a gas pedal into a desired torque to be given off by the internal combustion engine, comprising the following steps:

determining a reference charge value for air charging by way of a predetermined working-point-dependent lambda value ($\lambda_{opt}$);

setting a throttle valve position based on said reference charge value;

calculating the desired torque with the reference lambda value, parallel with said step of setting; and calculating an actual charge value measured from a charge detection to yield a fuel amount to be injected;

wherein the reference lambda value is based on a determined optimal lambda value for a mode of operation of homogeneous compression ignition, as long as said optimal lambda value is within rich and lean limits, respectively, of a combustion method of homogeneous compression ignition, and wherein the fuel amount is adjusted at the rich limit and lean limit, respectively, of the combustion method, by lambda regulation, so that the amount of fuel to be adjusted allows dynamic operation within the operating mode of homogeneous compression ignition.

2. A method according to claim 1, wherein the optimal lambda value as well as the lambda value at the rich and lean limits of the operating method of homogeneous compression ignition are determined on a test bench, as a function of working point, and stored in a memory of a control device, in working-point-dependent characteristic fields.

* * * * *